No. 855,681. PATENTED JUNE 4, 1907.
H. C. WARD.
PLAYING CARDS.
APPLICATION FILED AUG. 2, 1906.

3 SHEETS—SHEET 1.

Witnesses
Inventor
H. C. Ward,
By O'Meara & Brock
Attorneys

No. 855,681. PATENTED JUNE 4, 1907.
H. C. WARD.
PLAYING CARDS.
APPLICATION FILED AUG. 2, 1906.

3 SHEETS—SHEET 2.

Witnesses
M. Blondell,
E. B. McBath,

Inventor
H. C. Ward,
By O'Meara Brock
Attorneys

No. 855,681. PATENTED JUNE 4, 1907.
H. C. WARD.
PLAYING CARDS.
APPLICATION FILED AUG. 2, 1906.

3 SHEETS—SHEET 3.

*Fig. 73.*

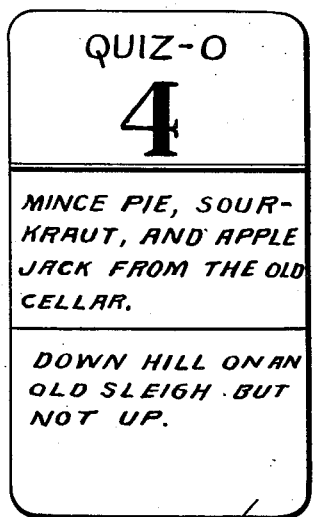

QUIZ-O
4

MINCE PIE, SOUR-KRAUT, AND APPLE JACK FROM THE OLD CELLAR.

DOWN HILL ON AN OLD SLEIGH BUT NOT UP.

*Fig. 74.*

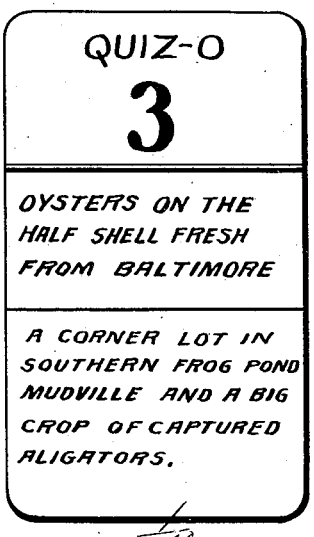

QUIZ-O
3

OYSTERS ON THE HALF SHELL FRESH FROM BALTIMORE

A CORNER LOT IN SOUTHERN FROG POND MUDVILLE AND A BIG CROP OF CAPTURED ALIGATORS.

*Fig. 75.*

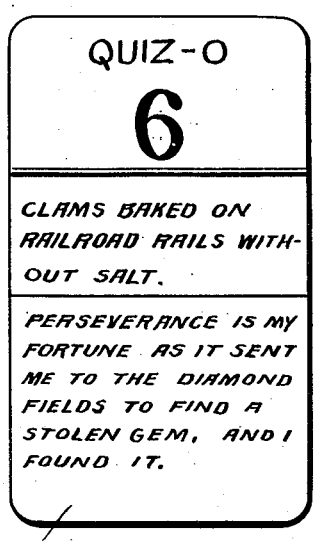

QUIZ-O
6

CLAMS BAKED ON RAILROAD RAILS WITHOUT SALT.

PERSEVERANCE IS MY FORTUNE AS IT SENT ME TO THE DIAMOND FIELDS TO FIND A STOLEN GEM, AND I FOUND IT.

*Fig. 76.*

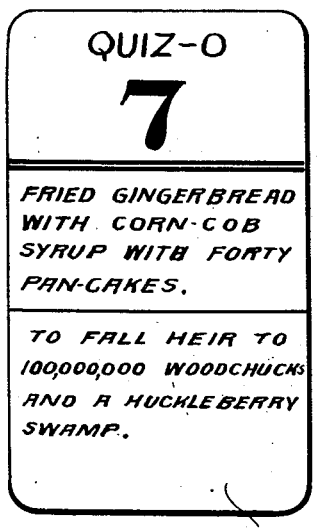

QUIZ-O
7

FRIED GINGERBREAD WITH CORN-COB SYRUP WITH FORTY PAN-CAKES.

TO FALL HEIR TO 100,000,000 WOODCHUCKS AND A HUCKLEBERRY SWAMP.

*Fig. 77.*

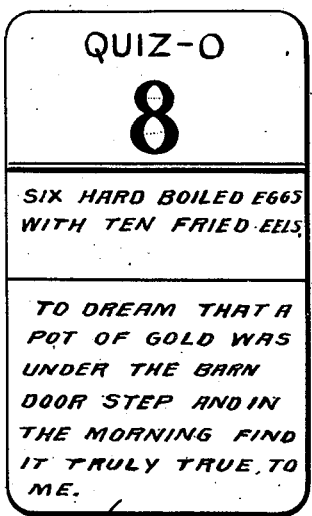

QUIZ-O
8

SIX HARD BOILED EGGS WITH TEN FRIED EELS

TO DREAM THAT A POT OF GOLD WAS UNDER THE BARN DOOR STEP AND IN THE MORNING FIND IT TRULY TRUE TO ME.

*Fig. 78.*

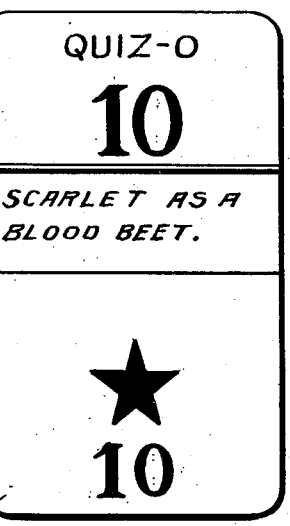

QUIZ-O
10

SCARLET AS A BLOOD BEET.

★

10

Witnesses
Inventor
H. C. Ward,
By O'Meara Brock
Attorneys

UNITED STATES PATENT OFFICE.

HENRY C. WARD, OF CHIPPEWA LAKE, MICHIGAN.

PLAYING-CARDS.

No. 855,681.  Specification of Letters Patent.  Patented June 4, 1907.

Application filed August 2, 1906. Serial No. 328,907.

*To all whom it may concern:*

Be it known that I, HENRY C. WARD, a citizen of the United States, residing at Chippewa Lake, in the county of Mecosta and State of Michigan, have invented a new and useful Improvement in Playing-Cards, of which the following is a specification.

This invention relates to a card game and the object of the invention is a game of this character which may be either amusing or instructive according to the taste of the player.

Figure 1:
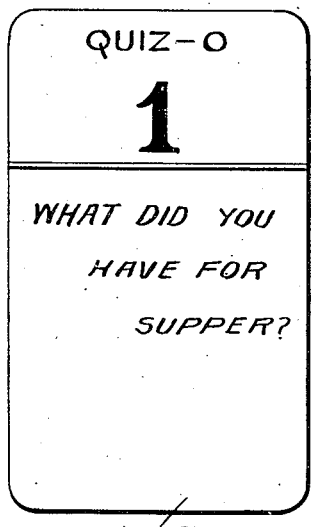
Figure 2:
Figure 3:
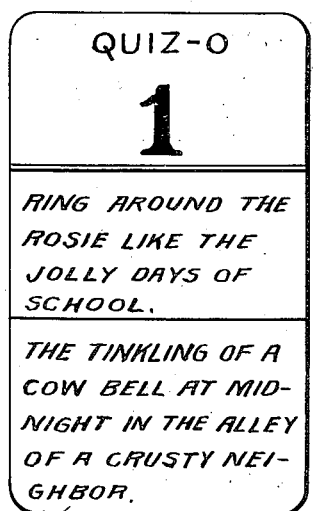
Figure 4:
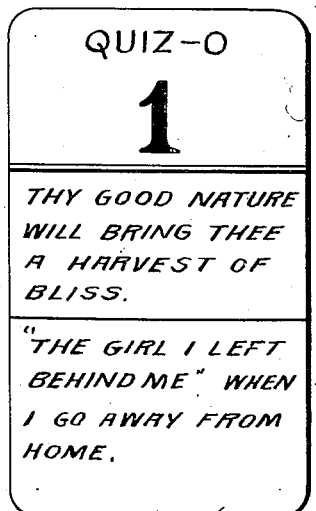
Figure 5:
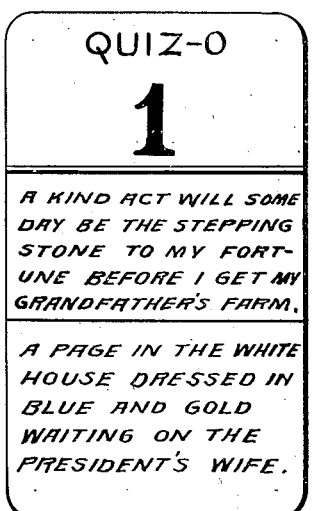
Figure 6:
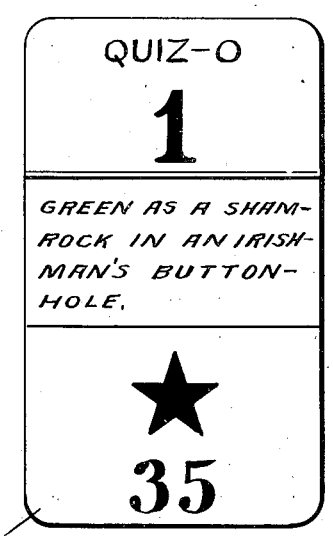
Figure 7:
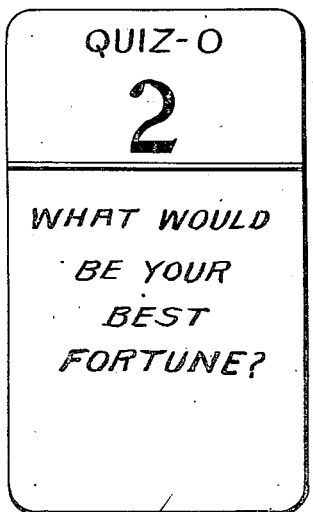
Figure 8:
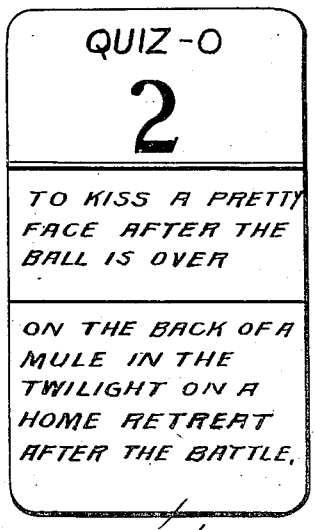
Figure 9:
Figure 10:
Figure 11:
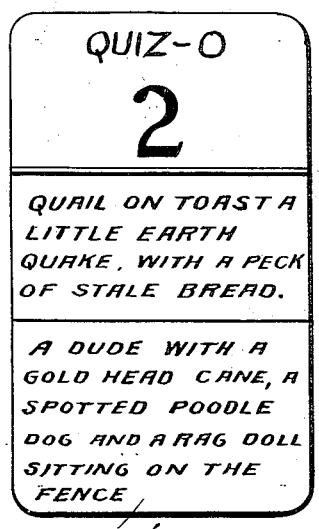
Figure 12:
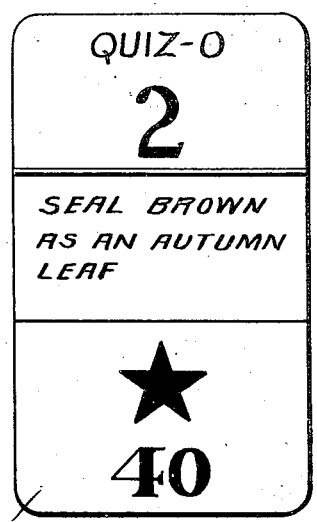

The invention consists of a game as hereinafter described, pointed out in the claims and shown in the accompanying drawings, in which, Figures 1, 2, 3, 4, 5 and 6 show face views of the cards belonging to one suit. Figs. 7, 8, 9, 10, 11 and 12 are face views of cards of another suit. Figs. 13, 14, 15, 16, 17 and 18 are face views illustrating each one card of a suit, the card from each of six suits being shown.

In these drawings A represents a question card which bears at the top the word Quiz—O, the numeral 1, to indicate the number of the suit, and a suitable question, which question may either be of an amusing or instructive character. A' illustrate four cards also belonging to the same suit as card A, and having the word Quiz—O at the top, and the numeral 1 to indicate the suit and each of these cards contains two answers to a question contained on a question card of another suit. A² indicates what will be termed a star card, which contains the word Quiz—O at the top, the numeral 1 to indicate the suit, one answer to a question upon a question card of a different suit, and the representation of a star and numerals to indicate the value of the said star card. In the same manner B indicates a question card of a second suit, B' the four answer cards containing two answers each, B² the star card having thereon one answer, a representation of a star and the numeral 40, indicating the value of said star card. C indicates an answer card of suit four, D an answer card of suit 3, E an answer card from suit 6, F an answer card from suit 7, G an answer card from suit 8 and H a star card belonging to suit number 10. From an examination of these cards, it will be obvious that there are ten suits in the deck, each of which consists of six cards, making sixty cards altogether, and the game is designed to be played by ten persons but may be played by a smaller number by withdrawing some of the suits.

By referring to sheets 1 and 2 of the drawing, it will be noticed that each suit of six cards is made up of a question card and the four answer cards having two answers thereon, which answers are to questions upon question cards of a different suit and one star card having one question and a numeral indicating the value of the card.

The game is played as follows:—Six cards are distributed by the dealer to the various players or sixty cards in all, assuming that there are ten players. Each player examines the face of the cards dealt to him and when all of the cards have been dealt, the players trade or exchange cards, each player trading one of his cards for another card, the face of which is unseen by him. The object of the trading is to acquire six cards, all of which belong to the same suit. As soon as a player holds in his hands, six cards all bearing at the top the same numeral the player calls out Quiz—O and the trading is then stopped, the party holding the complete suit puts to the other player the question carried upon his question card. The player to whom the question is put must answer from the answers contained upon cards held in his hand.

Various rules may be adopted for counting points in the game as for example, the party who gets what is known as the Quiz—O hand will get the star number of the suit held by him, and for every incorrect or misfit answer given to one of his questions, the party having the Quiz—O hand makes 5, and if the player failed to make answer, the party putting the question receives 10. For a correct answer he receives nothing. The other players may also count the highest star number held by them. Any other suitable rules for counting points or scoring may be adopted as desired by the players.

Having thus fully described my invention, what I claim as new and desire to secure by Letters Patent, is:—

1. A deck of playing cards consisting of a plurality of suits, each suit consisting of a plurality of cards, one of said cards being a question card, one a star card and the remaining cards of the suit having answers to questions printed thereon, the said answers being to questions of a suit different from that to which the answer cards belong.

2. A deck of playing cards consisting of a plurality of suits, each suit consisting of one question card, one star card, and four answer cards, the answer cards having thereon answers adapted to fit question cards of a different suit as and for the purpose set forth.

HENRY C. WARD.

Witnesses:
C. L. GRANT,
I. O. WARD.